United States Patent Office 3,448,154
Patented June 3, 1969

3,448,154
POLYAMINES CONTAINING ETHER OXYGEN LINKAGES
Ronald L. Broadhead, Addison, Ill., and Frederick D. Timmons, Alliance, Ohio, assignors to The Richardson Company, Melrose Park, Ill., a corporation of Ohio
No Drawing. Filed Apr. 4, 1966, Ser. No. 539,628
Int. Cl. C07c 97/02, 141/08
U.S. Cl. 260—584    4 Claims

ABSTRACT OF THE DISCLOSURE

Process for preparing secondary diamines with at least one internal ether oxygen by reacting a polyalkylene glycol with a sulfating agent such as sulfur trioxide to form a disulfate product and reacting the disulfate product with a primary amine in the presence of a base catalyst such as calcium hydroxide to produce the amine. The use of calcium hydroxide enables the conversion of the sulfate to an insoluble product during the formation of the diamine product.

---

This invention relates to secondary diamines and to their preparation, and more particularly, to secondary diamines which are characterized by at least one internal ether oxygen.

The secondary diamines of the invention are useful as corrosion inhibitors, neutralizers and emulsifiers, and as reactants in the preparation of phenolic resins. The diamines of particular interest are aliphatic and have the following formula:

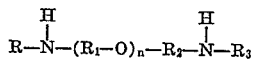

wherein R, $R_1$, $R_2$ and $R_3$ are each aliphatic and $n$ is an integer of at least one.

As represented by the above formula, these secondary diamines exhibit unusual properties. They are difunctional with only one hydrogen attached to each of the two amino hydrogens. They are characterized by hydrogen bonding with the internal ether oxygen (in addition to that with each of the two amino nitrogens) which decreases the vapor pressure of the compounds without requiring a reactant group. They are generally miscible in water systems which contributes greatly to their effectiveness in water. In addition, they provide flexibility to phenolic resins when incorporated therein. With this combination of properties, the secondary diamines offer unusual advantages for the above-described purposes.

In the above formula, R, $R_1$, $R_2$ and $R_3$ are aliphatic. Advantageously, the diamines are saturated in the interconnecting chain ($R_1$ and $R_2$) and may be further described as secondary diamines having at least one internal ether oxygen, one hydrogen directly attached to the nitrogen, and intervening alkylene groups between the amino and oxy groups and between any plurality of oxy groups present.

Generally, the alkylene groups in the secondary diamines have about 2–22 carbon atoms. Determination of particularly advantageous ranges of carbon atoms is effected by the end use involved, cost of raw materials and the like. To illustrate, alkylene groups of about 16–22 carbon atoms are available through the hereinafter described process from fatty compounds. The combination of the fatty alkylene groups with ether oxygens provides advantageous miscibility properties for the diamines in water systems. In another illustration, alkylene groups of about 2–12 and more advantageously about 2–5 carbon atoms in combination with ether oxygens provides enhanced hydrogen bonding as well as lower volatility for the diamine.

Suitable alkylene groups are radicals of ethane, the propanes, butanes, pentanes, heptanes, octanes, decanes, dodecanes, tetradecanes, hexadecanes, octadecans, nonadecanes, heneicosanes, docosanes and the like. It is to be understood that different alkylene groups can be present in the same molecule.

The number of ether oxygens present in the diamine is also dependent on the end use involved, source of raw materials, carbon content of the alkylene groups, and the like; although usually about 1 to about 10, advantageously about 1 to about 5, and preferably about 1 to 2 ether oxygens provide the desirable properties to the secondary diamines. In some instances, it is advantageous to utilize diamines with the interconnecting chain being derived from the polyethylene glycols to provide a highly flexible chain with the terminal amino groups.

In addition to the interconnecting chain and one hydrogen, each amino nitrogen is also attached to an aliphatic group containing about 1 to about 22 carbon atoms. Illustrations of suitable groups include the above-described alkylene groups as well as the corresponding olefinically unsaturated groups. It is usually advantageous to use the lower alkylamines having about 1 to 5 carbon atoms because of their availability and the resultant yields. Preferred amines are methyl amine and ethyl amine.

The secondary diamines of the invention are advantageously prepared from a polyalkylene glycol by treating the glycol with a sulfating agent such as sulfur trioxide under sulfating conditions to produce a disulfate product and reacting the disulfate product with an aliphatic primary amine having two hydrogens directly attached to the nitrogen in the presence of a base catalyst such as an alkaline hydroxide to produce the secondary diamine. Based on triethylene glycol (which is converted to a disulfate) and methyl amine, the process commonly produces the secondary diamine in yields of 50–90 percent at temperatures for the aminolysis reaction of about 150–300° C. and at mole ratios of at least about 1:2 for the disulfate product and primary amine, respectively, and usually about 1:2–8. Advantageously, the process is carried out in an aqueous medium through the use of a water soluble disulfate such as a disodium salt of triethylene glycol disulfuric acid. Also, the process advantageously utilizes a base catalyst such as calcium hydroxide in the aminolysis reaction which converts the sodium sulfate or sulfuric acid formed in the reaction to an insoluble calcium sulfate. Preferably, the process is carried out with sulfur trioxide as the sulfating agent (since it does not generate aqueous products) in an aqueous medium, with the aliphatic amine being added to produce a mole ratio of about 1:5 of disulfate to primary amine, and the reaction is carried out at a temperature of about 150–300° C.

Suitable polyalkylene glycols include those having alkylene and ether groups previously described for the interconnecting chain of the secondary diamines. As recognized from the reactions, the backbone of the glycol is incorporated into the diamine and forms the interconnecting chain.

Suitable sulfating agents include sulfuric acid, oleum, chlorosulfonic acid, sulfamic acid, sulfur trioxide, complexes of sulfur trioxide, and the like with sulfur trioxide being preferred because it is convenient and easy to use and does not form aqueous products or require a diluent for the glycol. Usually, the sulfur trioxide is utilized in a mixture with dry air or nitrogen.

The sulfation is usually carried out with a slight excess of the sulfating agent and at a moderate temperature in the order of 20–40° C. to produce yields in the order of 80–100 percent of the disulfate product.

The disulfate product may be disulfuric acid or its salt. In some instances, the acid form of the disulfate product is not entirely stable when stored. Therefore, when the aminolysis reaction is carried out immediately after the sulfation, the acid form of the disulfate product can be conveniently utilized. When the aminolysis reaction is carried out at a later time, usually the acid form is converted to a water soluble salt form such as its disodium salt which can be utilized in the aminolysis reaction.

The base catalyst for the aminolysis reaction is a strong base and usually is an alkali and/or alkaline earth metal hydroxide such as sodium, potassium, calcium and the like, and preferably calcium hydroxide which not only catalyzes the reaction but also converts the sulfate or sulfuric acid produced in the reaction to an insoluble form.

The following examples illustrate some embodiments of this invention. It will be understood that these are for illustrative purposes only and do not purport to be wholly definitive with respect to conditions or scope.

EXAMPLE I

A secondary diamine was prepared by first sulfating triethylene glycol and then reacting the disulfate with methyl amine to form the diamine. In the preparation, approximately 590 grams (6.3 moles) of 15–18% by weight of oleum was placed into a reaction flask provided with a stirrer, thermometer, dropping funnel, vertical condenser (protected by a drying tube) and an external cooling bath. Approximately 450 grams (3.0 moles) of triethylene glycol was added to the well-stirred acid at a rate such that the addition was completed in 1.5–2 hours at temperatures not exceeding about 35° C. The yield of the disulfate product was approximately 81 mole percent as determined by titration with a standardized NaOH solution in the presence of a Phenol phthalein indicator.

The disulfate product in the form of the disodium salt was converted to the secondary diamine with methyl amine. An aqueous solution of the disodium salt containing approximately 2.23 moles of the active ingredient, 4.46 moles of $Ca(OH)_2$ as the base catalyst, and 11.2 moles of methylamine (about 40 weight percent) in an aqueous solution were charged into an autoclave. These ratios provided about 1 mole of $Ca(OH)_2$ and about 2.5 moles of methylamine for each sulfate group to be replaced in the aminolysis. The autoclave was sealed, then heated to a temperature of approximately 175° C., and stirred for approximately 7.5 hours. At 175° C., the pressure was approximately 190 p.s.i.g. After the 7.5 hour period, the reactor was cooled to room temperature and the contents were removed, filtered free of $CaSO_4$ and flash-distilled under partial vacuum to remove unreacted methylamine and some water. The product, bis(N-methyl-amino ethoxy) ethane, was analyzed by titration of aliquot portions with standard acid in the presence of bromophenol Blue indicator. The analysis indicated a yield of approximately 87 weight percent based on the disulfate product.

Additional purification of the diamine was carried out by flash distilling off the aqueous solvent, filtering off any $CaSO_4$, distilling the residue under vacuum, and collecting the overhead product which boiled at 70–75° C./0.2–0.5 mm. Hg.

EXAMPLE II

Sulfation of triethylene glycol was also carried out with sulfur trioxide. In the process, a mixture of vaporized sulfur trioxide (about 3.5%) and dry air was passed into the triethylene glycol and produced the disulfate product in a yield of about 95%.

EXAMPLE III

Other preparations of the secondary diamine of Example 1 were carried out under the general procedure of Example I except for the changes listed in Table I below. The yields of diamine from these runs are listed in Table I opposite the applicable conditions. Run 3 corresponds to the results from Example I.

TABLE I

| Run | Yield, percent | Temperature, °C. | Pressure, P.s.i. | Time, Hrs. | Mole Ratio | Catalyst |
|---|---|---|---|---|---|---|
| 1 | 36 | 105 | 40±5 | 7.5 | 5.0 | $Ca(OH)_2$ |
| 2 | 62 | 170 | 150 | 7.5 | 5.0 | $Ca(OH)_2$ |
| 3 | 87 | 175±5 | 190±10 | 7.5 | 5.0 | $Ca(OH)_2$ |
| 4 | 80 | 185±5 | 285±30 | 7.5 | 5.0 | $Ca(OH)_2$ |
| 5 | 74 | 200±10 | 280±30 | 7.5 | 5.0 | $Ca(OH)_2$ |
| 6 | 40 | 160 | 200 | 7.5 | 8.0 | $Ca(OH)_2$ |
| 7 | 40 | 170 | 220 | 7.5 | 8.0 | $Ca(OH)_2$ |
| 8 | 55 | 285 | 300 | 8.0 | 9.0 | $Ca(OH)_2$ |

The above results for Runs 1–5 demonstrate that the highest yield of 87% was achieved at about 175° C. and 190 p.s.i., and that an increase or decrease in the temperature resulted in reduced yields. The results for Runs 6–8 demonstrate that temperatures in the order of 285° C. were suitable in the process and that in general, the yields were lower when the ratio of amine to disulfate product was raised from 5.0 to about 8.0.

We claim:
1. A process for preparing secondary diamines characterized by the formula

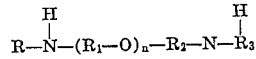

wherein R and $R_3$ are aliphatic with 1–22 carbon atoms, $R_1$ and $R_2$ are alkylene with 2–22 carbon atoms, and $n$ is an integer of at least one, which process comprises treating a polyalkylene glycol having about 2–22 carbon atoms in each alkylene group, with sulfur trioxide under sulfating conditions and at a temperature of about 20–40° C. to produce a disulfate product, and reacting the product with an aliphatic primary amine with 1–22 carbon atoms, said disulfate and amine being present in the mole ratio of about 1:2–8, said reaction being carried out with an alkaline earth metal hydroxide at a temperature of 150–300° C. and a pressure above atmospheric to produce the diamine.

2. The process of claim 1 wherein said treatment and reaction steps are carried out in an aqueous medium.

3. The process of claim 2 wherein said primary amine is a lower alkyl primary amine.

4. The process of claim 2 wherein said catalyst is calcium hydroxide.

References Cited

UNITED STATES PATENTS

| | | |
|---|---|---|
| 1,919,301 | 7/1933 | Morton. |
| 2,716,134 | 8/1955 | Reynolds et al. |
| 2,717,270 | 9/1955 | Bindler. |
| 2,766,288 | 10/1956 | Erickson. |
| 3,070,552 | 12/1962 | Tesoro et al. |

CHARLES B. PARKER, *Primary Examiner.*

R. L. RAYMOND, *Assistant Examiner.*

U.S. Cl. X.R.

252—392, 357; 260—458, 47